United States Patent
Li et al.

(10) Patent No.: US 7,226,201 B1
(45) Date of Patent: Jun. 5, 2007

(54) FRAME STRUCTURE FOR BACKLIGHT MODULE

(75) Inventors: Chun-Hsien Li, Kaohsiung (TW); Ying Fu Wang, Kaohsiung (TW); Hui-Ching Hsueh, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 49 days.

(21) Appl. No.: 11/291,959

(22) Filed: Dec. 2, 2005

(51) Int. Cl.
*F21V 7/04* (2006.01)

(52) U.S. Cl. .................... 362/633; 362/374; 349/58; 349/63

(58) Field of Classification Search .......... 362/632, 362/633, 634, 373; 349/58, 60, 62, 63
See application file for complete search history.

(56) References Cited

U.S. PATENT DOCUMENTS

| | | | |
|---|---|---|---|
| 6,392,724 B2 * | 5/2002 | An et al. ..................... | 349/58 |
| 6,667,780 B2 * | 12/2003 | Cho .............................. | 349/58 |
| 6,976,781 B2 * | 12/2005 | Chu et al. ................... | 362/633 |
| 2004/0080952 A1 * | 4/2004 | Chu et al. ................... | 362/374 |
| 2004/0170009 A1 * | 9/2004 | Ho .............................. | 362/31 |
| 2006/0098459 A1 * | 5/2006 | Kao et al. ................... | 362/633 |

* cited by examiner

*Primary Examiner*—John Anthony Ward
(74) *Attorney, Agent, or Firm*—Leong C. Lei (57) ABSTRACT

A frame structure for backlight modules is provided herein. A backlight module according to the present invention mainly contains a frame structure, a reflection plate, a light guide plate, optical films, and a light source unit. The frame structure contains a plate member and a frame member. There are a number of hook elements and clasp elements configured at corresponding locations along the edges of the plate member and the frame member respectively. Also along the edges of the plate member and frame member, there are a number of grooves and stopping blades configured at corresponding locations on the plate member and frame member respectively. When the frame member is joined to the plate member, their corresponding clasp elements and hook elements would interact to fixedly join together, and the stopping blades would stick into the corresponding grooves to prevent the frame member from deformation and escape under heavy pressure or strong impact.

4 Claims, 10 Drawing Sheets

PRIOR ART

FRAME STRUCTURE FOR BACKLIGHT MODULE

BACKGROUND OF THE INVENTION (a) Technical Field of the Invention

The present invention generally relates to backlight modules for liquid crystal display devices, and more particularly to a frame structure for the assembly of the various components of a backlight module.

(b) Description of the Prior Art

A liquid crystal display (LCD) device requires a planar light source device to provide lighting having high uniformity, brightness, and a wide viewing angle. The planar light source device usually contains at least a backlight module and a front light module.

Figure 1:
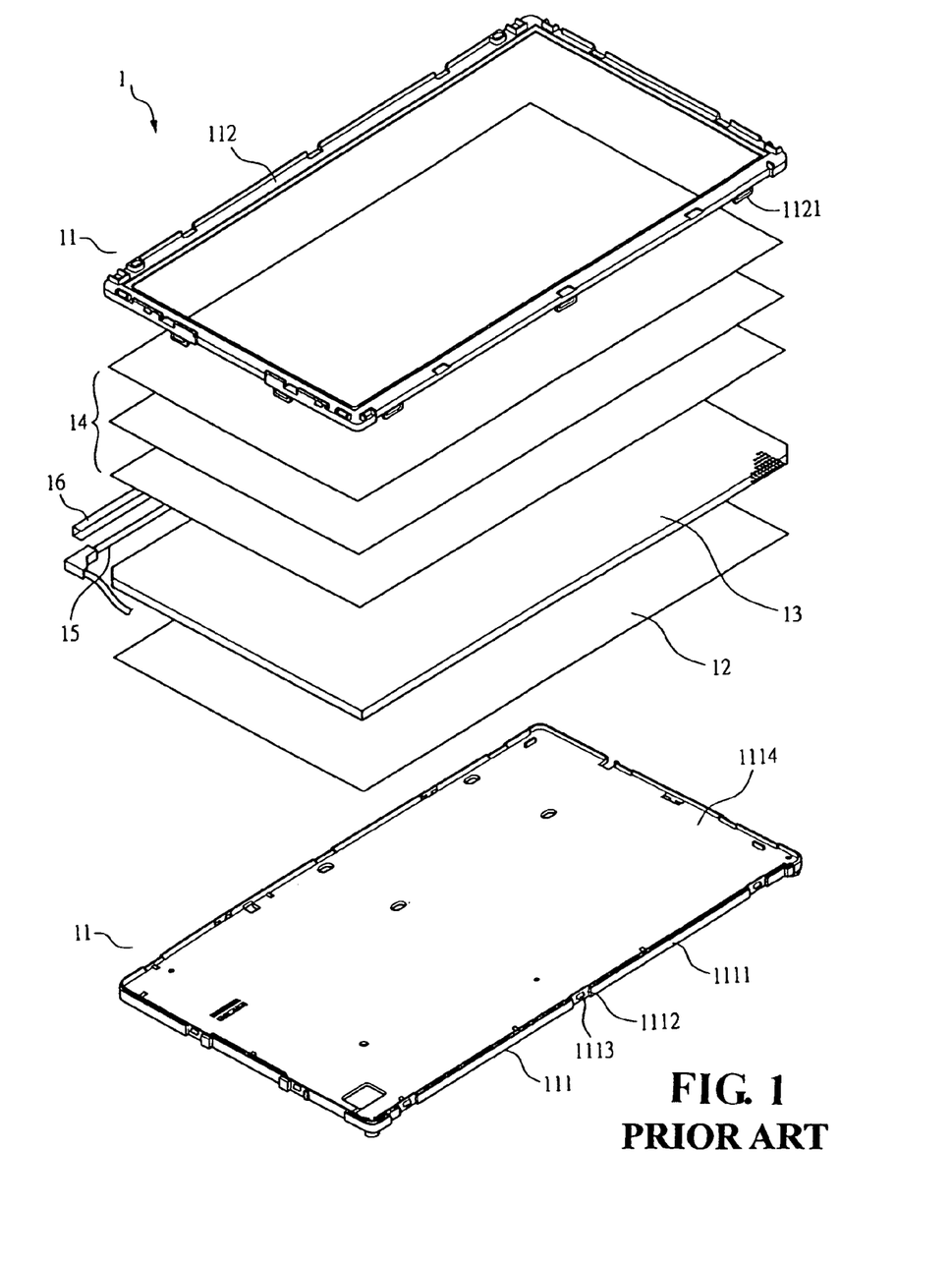
FIG. 1 is a perspective blown-up view showing the various components of a conventional edge-lit backlight module.

A conventional edge-lit backlight module, as shown in FIG. 1, mainly contains a frame structure 11, a reflection plate 12, a light guide plate. 13, optical films 14, and a light source unit 15 using, for example, cold cathode fluorescent lamp (CCFL).

The frame structure 11, usually made of a plastic material, contains a plate member 111 and a frame member 112. Along the edges 1111 of the plate member 111, there are a number of notches 1112, each of which has a hook element 1113 there within. The edges 1111 of the plate member 111 jointly confine a hollow area 1114 for accommodating the reflection plate 12 and the light guide plate 13 sequentially in this order from bottom to top inside the hollow area 1114. Along the edges (not numbered) of the frame member 112, there are clasp elements 1121 located correspondingly to the hook element 1113 of the plate member 111. When the frame member 112 is pressed against the plate member 111, their corresponding clasp elements 1121 and hook elements 1113 would interact to fixedly join the frame member 112 and the plate member 111 together. The optical films 14, including one or more diffusion sheets and prism sheets, are arranged on the surface of the light guide plate 13 for scattering the light to achieve better uniformity and for focusing the light into a proper viewing angle to achieve brightness enhancement. The elongated light source unit 15 is wrapped inside a reflector 16 to direct its light into a side of the light guide plate 13. The two ends of the light source unit 15 are configured with locking elements 151 to fix the light source unit 15 to the frame structure 11. The employment of the reflector 16 is to enhance the utilization of the light from the light source unit 15.

Figure 2:
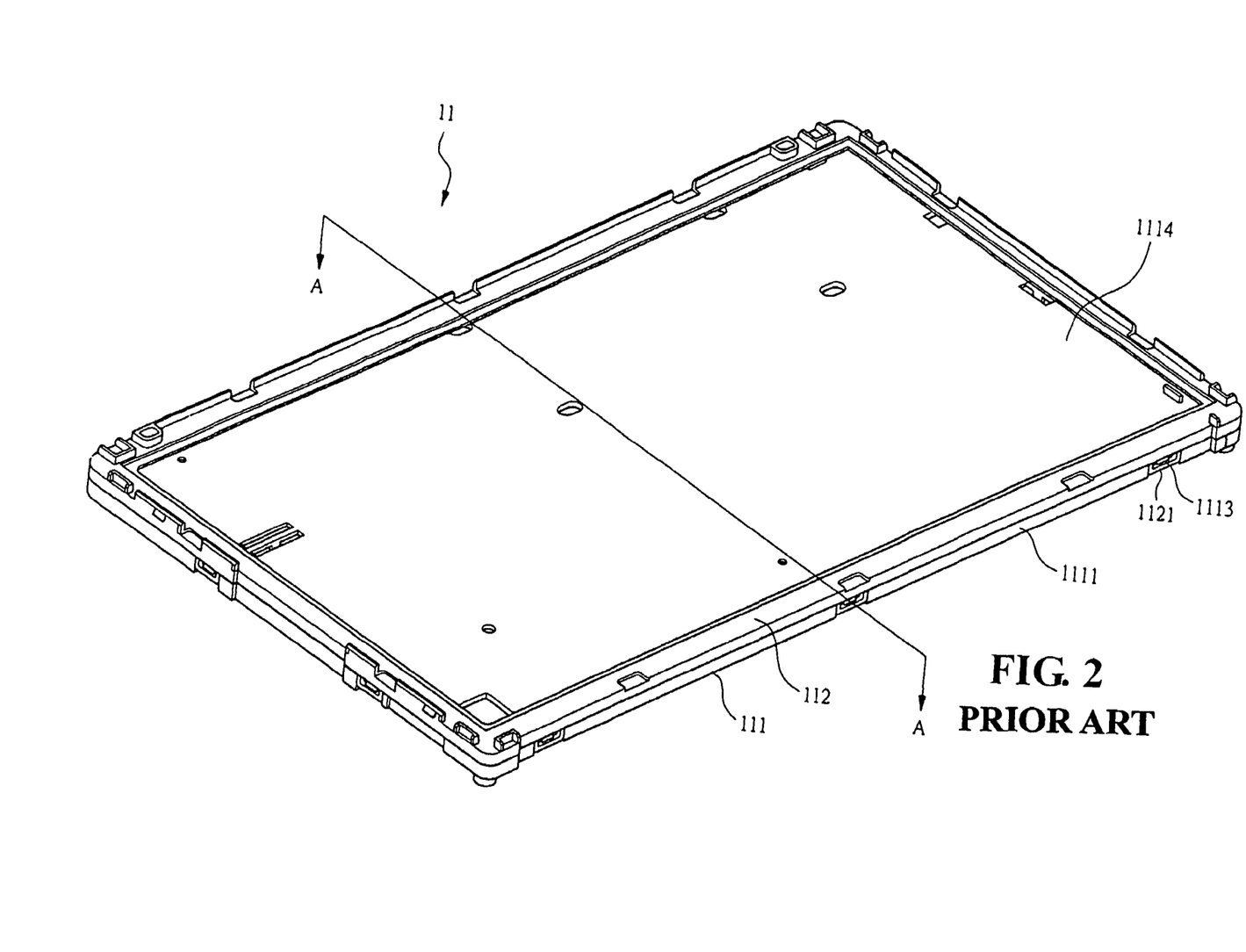
FIG. 2 is a perspective view showing the conventional edge-lit backlight module of FIG. 1 after its assembly.

To assembly the backlight module 1 illustrated in FIG. 1, at first, the light source unit 15 is placed inside the reflector 16, and the light source unit 15 and the reflector 16 are fixed to a side of the frame structure 11. Then, the reflection plate 12 and the light guide plate 13 are placed in the hollow area 1114 of the plate member 111, with the light incidence side of the light guide plate 13 embedded into the opening of the reflector 16. The optical films 14 are then stacked on the light guide plate 13. At last, the frame member 112 is pressed against the plate member 111 so that their corresponding clasp elements 1121 and hook elements 1113 are locked to each other. The assembly of the backlight module 1 is then accomplished, whose result is shown in FIG. 2.

Figure 3:
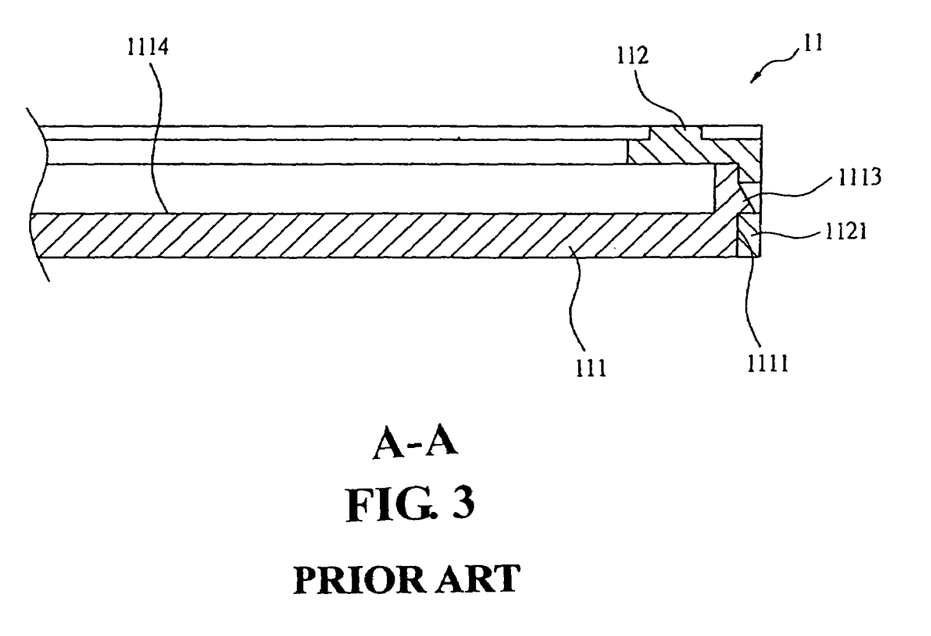
FIG. 3 is schematic sectional view showing the locking mechanism of the conventional edge-lit backlight module of FIG. 1 along the A-A line.

The locking mechanism of the conventional edge-lit backlight module 1 has some shortcomings. For example, since the frame structure 11 is made of a plastic material and has certain flexibility, when it is under a heavy pressure, the clasp elements 1121 would deform as it slides along the slope surface of the hook elements 1113 and escape from the confinement of the hook element 1113, as can be seen from FIG. 3. Without a strong support from the locking mechanism, the heavy pressure will land on the light source unit 15 as well, causing it to break in some worst-case scenarios.

Figure 4:
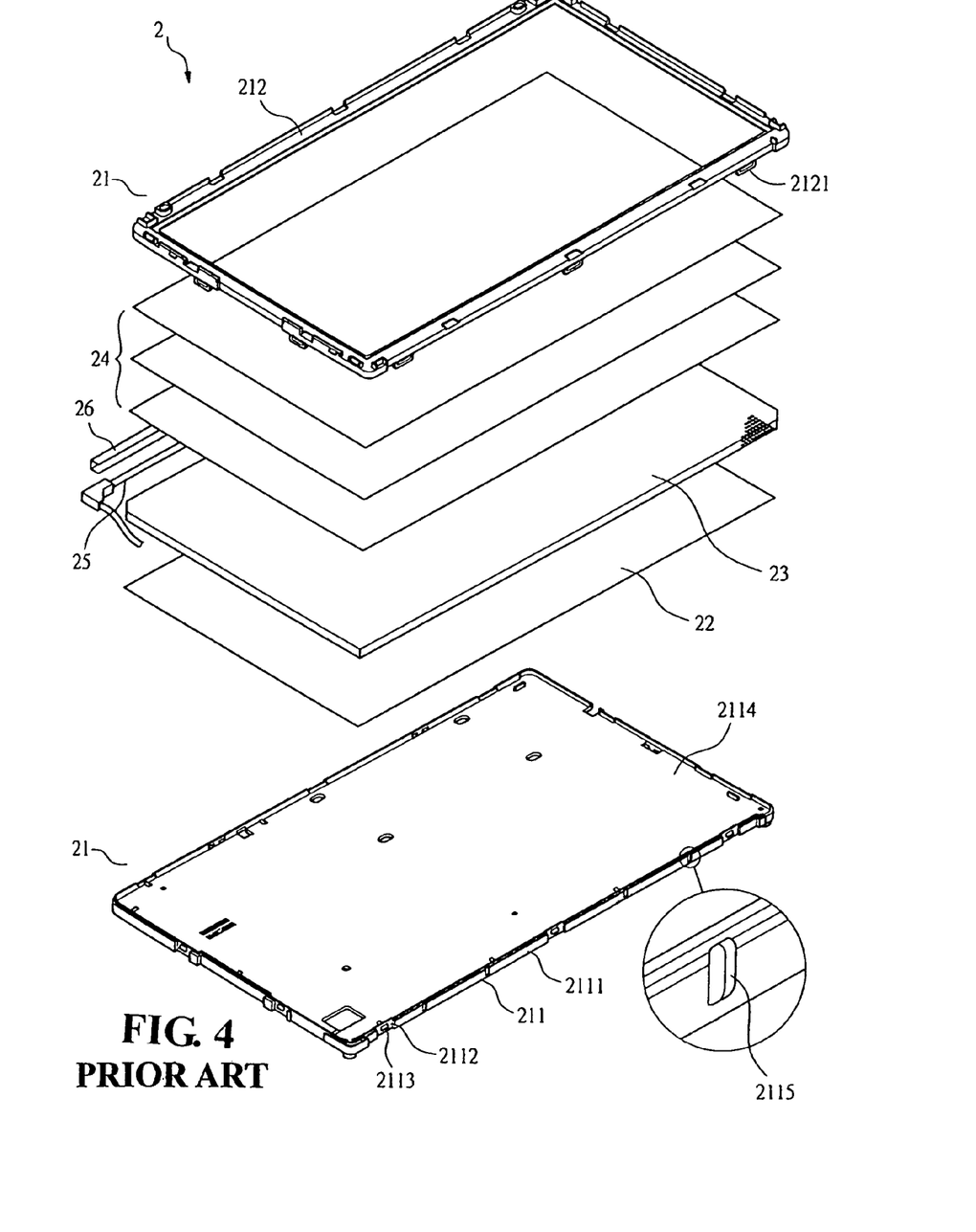
FIG. 4 is a perspective blown-up view showing the various components of another conventional edge-lit backlight module.

To overcome the problem, there are vendors providing a different structure for the backlight module 2 as shown in FIG. 4, which also contains a frame structure 21, a reflection plate 22, a light guide plate 23, optical films 24, and a light source unit 25 using, for example, cold cathode fluorescent lamp (CCFL).

The frame structure 21, usually made of a plastic material, contains a plate member 211 and a frame member 212. Along the edges 2111 of the plate member 211, there are a number of notches 2112, each of which has a hook element 2113 there within. The edges 2111 of the plate member 211 jointly confine a hollow area 2114 for accommodating the reflection plate 22 and the light guide plate 23 sequentially in this order from bottom to top inside the hollow area 2114. Also along the edges 2111 of the plate member 211, there are a number of supporting rods 2115 extending upward for an appropriate distance above the edges 2111 of the plate member 211. Along the edges (not numbered) of the frame member 212, there are clasp elements 2121 located correspondingly to the hook element 2113 of the plate member 211. When the frame member 212 is pressed against the plate member 211, their corresponding clasp elements 2121 and hook elements 2113 would interact to fixedly join the frame member 212 and the plate member 211 together. The optical films 24, including one or more diffusion sheets and prism sheets, are arranged on the surface of the light guide plate 23 for scattering the light to achieve better uniformity and for focusing the light into a proper viewing angle to achieve brightness enhancement. The elongated light source unit 25 is wrapped inside a reflector 26 to direct its light into a side of the light guide plate 23. The two ends of the light source unit 25 are configured with locking elements 251 to fix the light source unit 25 to the frame structure 21. The employment of the reflector 26 is to enhance the utilization of the light from the light source unit 25.

Figure 5:
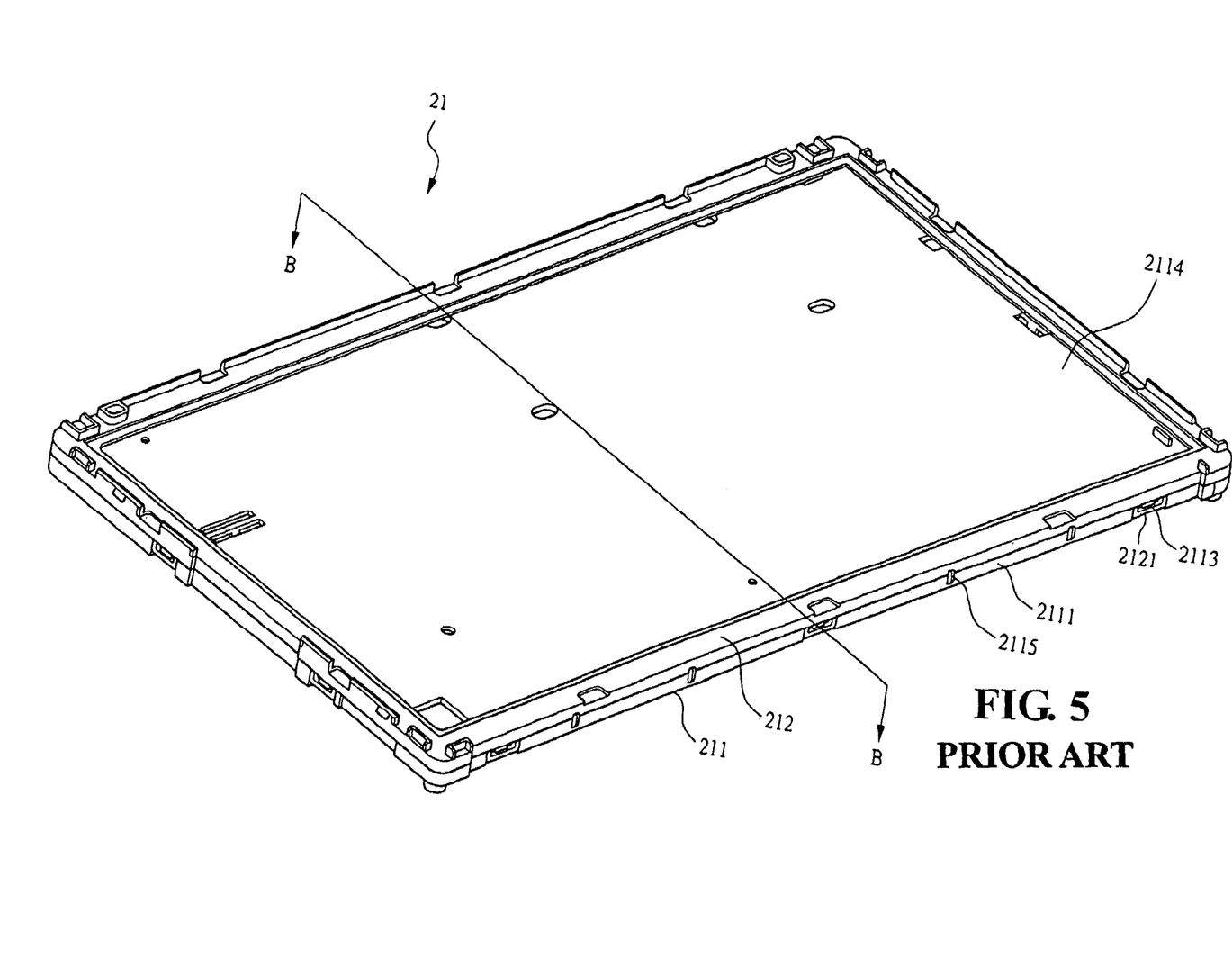
FIG. 5 is a perspective view showing the conventional edge-lit backlight module of FIG. 4 after its assembly.

To assembly the backlight module 2 illustrated in FIG. 4, at first, the light source unit 25 is placed inside the reflector 26, and the light source unit 25 and the reflector 26 are fixed to a side of the frame structure 21. Then, the reflection plate 22 and the light guide plate 23 are placed in the hollow area 2114 of the plate member 211, with the light incidence side of the light guide plate 23 embedded into the opening of the reflector 26. The optical films 24 are then stacked on the light guide plate 23. At last, the frame member 212 is pressed against the plate member 211 so that their corresponding clasp elements 2121 and hook elements 2113 are locked to each other. As such, the edges of the frame member 212 are also confined by the supporting rods 2115 of the plate member 211. The assembly of the backlight module 2 is then accomplished, whose result is shown in FIG. 5.

Figure 6:
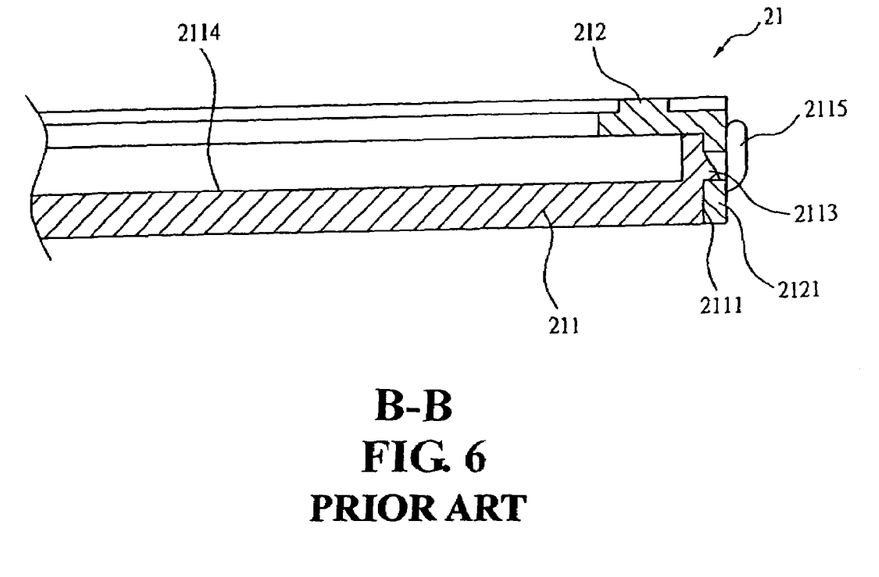
FIG. 6 is schematic sectional view showing the locking mechanism of the conventional edge-lit backlight module of FIG. 4 along the B-B line.

As shown in FIG. 6, because of the configuration of the supporting rods 2115, when the frame member 212 is under a heavy pressure, the supporting rods 2114 would prevent the clasp elements 2121 from sliding along the slope surface of the hook elements 2113 and thereby the clasp elements 2121 wouldn't deform and escape from the hook elements 2113, as can be seen from FIG. 6. However, the supporting rods 2115 would inevitably increase the planar area of the backlight module 2, which would cause some installation issues as the backlight module 2 is to be assembled into a final product along with other components of a LCD device.

SUMMARY OF THE INVENTION

The primary purpose of the present invention is to provide a frame structure for backlight modules to obviate the shortcomings of conventional approaches. A backlight module according to the present invention mainly contains a frame structure, a reflection plate, a light guide plate, optical films, and a light source unit. The frame structure contains a plate member and a frame member. There are a number of hook elements and clasp elements configured at corresponding locations along the edges of the plate member and the frame member respectively, so that, when the frame member is pressed against the plate member, their corresponding clasp elements and hook elements would interact to fixedly join the frame member and the plate member together.

Also along the edges of the plate member and frame member, there are a number of grooves and stopping blades configured at corresponding locations on the plate member and frame member respectively. When the frame member is joined to the plate member, the stopping blades would stick into the corresponding grooves to prevent the frame member to deform and escape under heavy pressure or strong impact and, thereby, prevent the light source unit from damage.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 7:
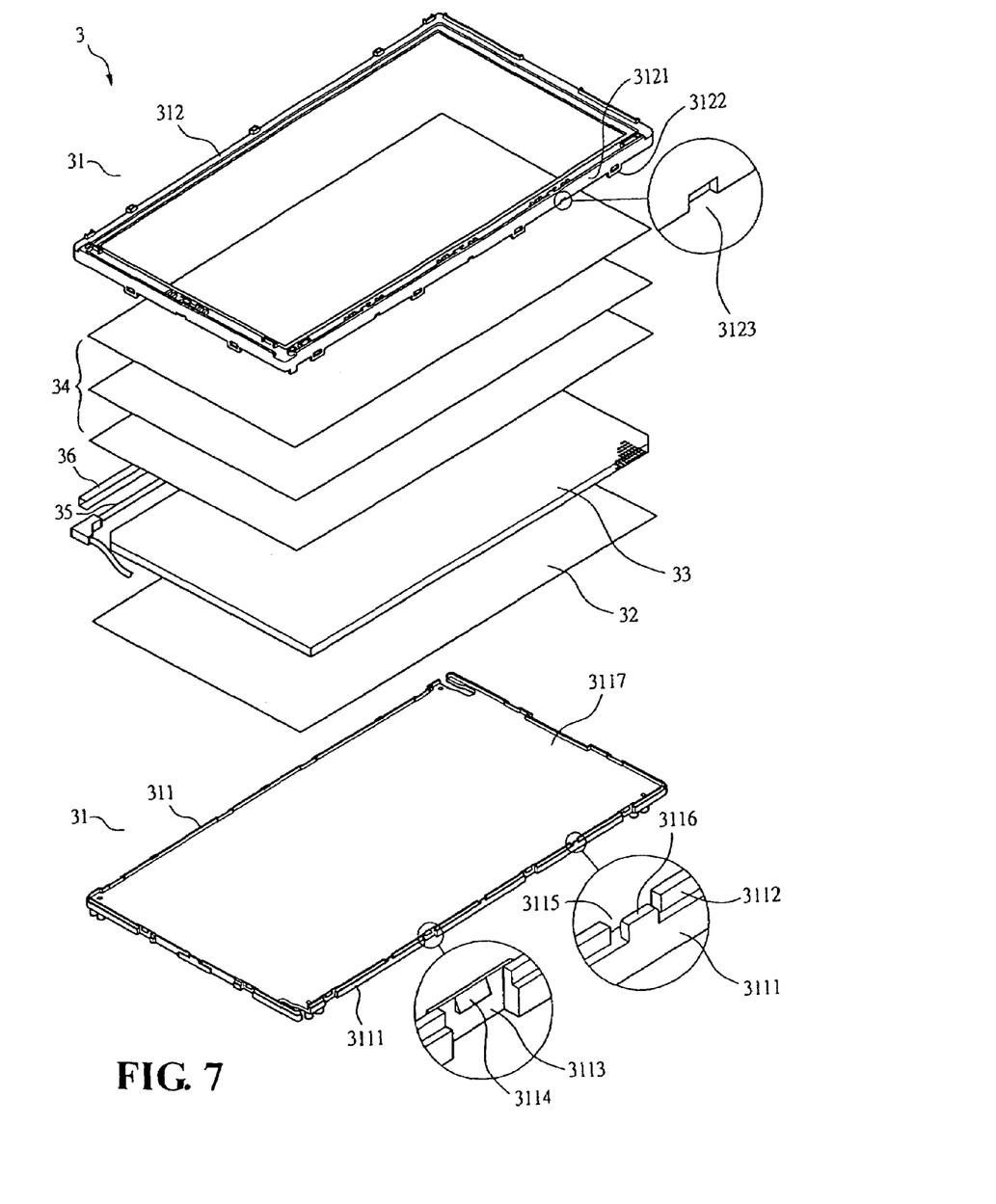
FIG. 7 is a perspective blown-up view showing the various components of a backlight module according to an embodiment of the present invention.

A backlight module 3 according to an embodiment of the present invention, as shown in FIG. 7, mainly contains a frame structure 31, a reflection plate 32, a light guide plate 33, optical films 34, and a light source unit 35 using.

Figure 8:
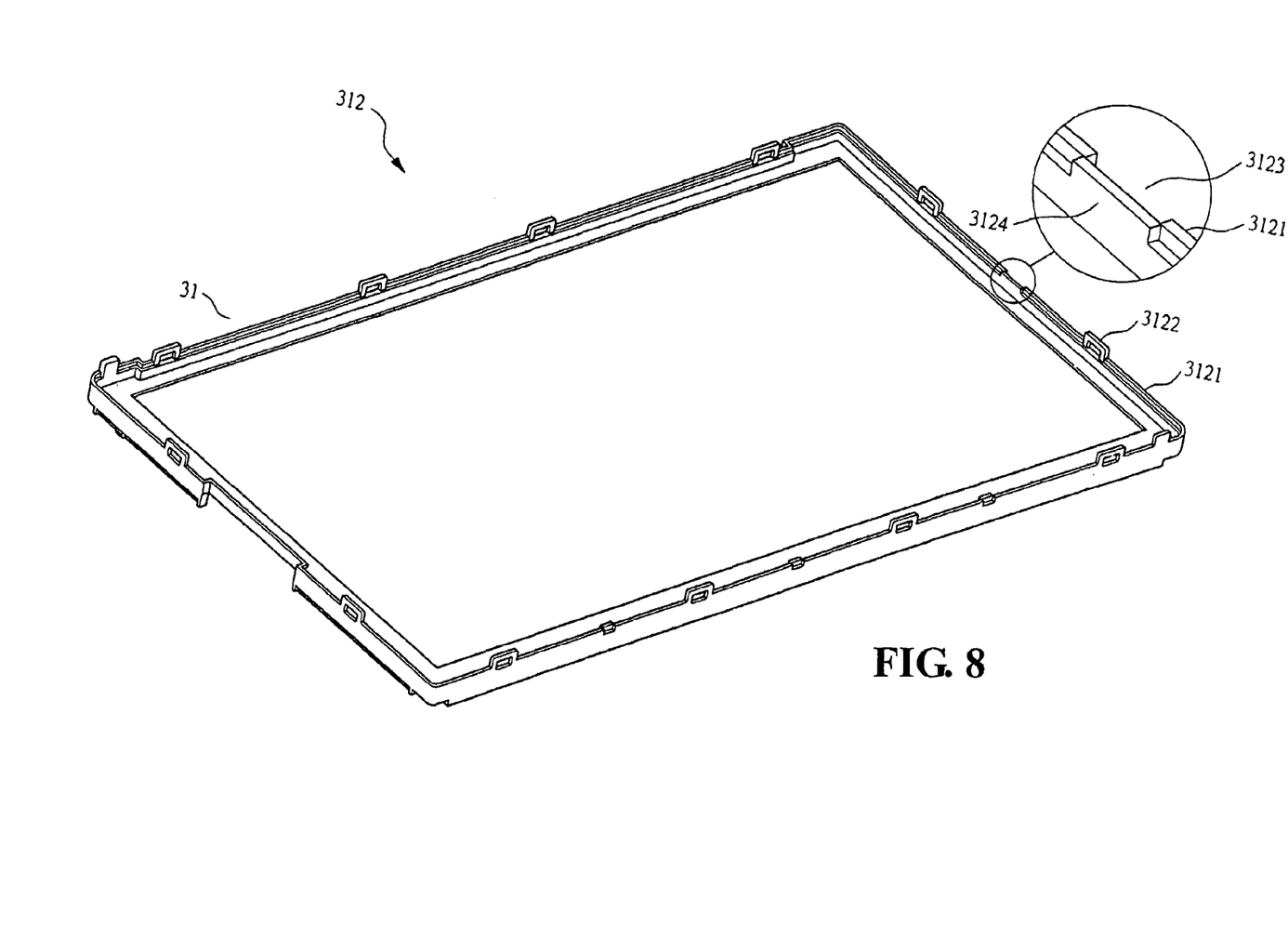
FIG. 8 is a perspective view showing the frame member of the backlight module of FIG. 7.

The frame structure 31, usually made of a plastic material, contains a plate member 311 and a frame member 312. Along the edges 3111 of the plate member 311, there are surrounding walls 3112 on top of the edges 3111 and receding toward the inside of the plate member 311 for an appropriate short distance. Along the edges 3111 and the surrounding walls 3112, there are a number of notches 3113, each of which has a hook element 3114 there within. Also along the surrounding walls 3112, there are a number of openings 3115. For each of the openings 3115, a stopping blade 3116 is configured on top of the edges 3111 right across the opening 3115. The surrounding walls 3112 of the plate member 311 jointly confine a hollow area 3117 for accommodating the reflection plate 32 and the light guide plate 33 sequentially in this order from bottom to top inside the hollow area 3114. Along the edges 3121 of the frame member 312, there are clasp elements 3122 extending out and located correspondingly to the notches 3113 of the plate member 311. When the frame member 312 is pressed against the plate member 311, the clasp elements 3122 would stick into the notches 3113 and lock to the hook elements 3114 inside the notches 3113. Also along the edges 3121 of the frame member 312, there are grooves 3123 located and configured correspondingly to the stopping blades 3116 so that, when the frame member 312 and the plate member 311 are joined, the stopping blades 3123 would fit perfectly into the grooves 3123. Along the edges 3121 of the frame member 312 and receding inward behind the grooves 3123, as shown in FIG. 8, there are blades 3124 for fitting into the openings 3115 when the frame member 312 and the plate member 311 are joined. The optical films 34, including one or more diffusion sheets and prism sheets, are stacked on the surface of the light guide plate 33. The elongated light source unit 35 is wrapped inside a reflector 36 to direct its light into a side of the light guide plate 33. The two ends of the light source unit 35 are configured with locking elements 351 to fix the light source unit 35 to the frame structure 31.

Figure 9:
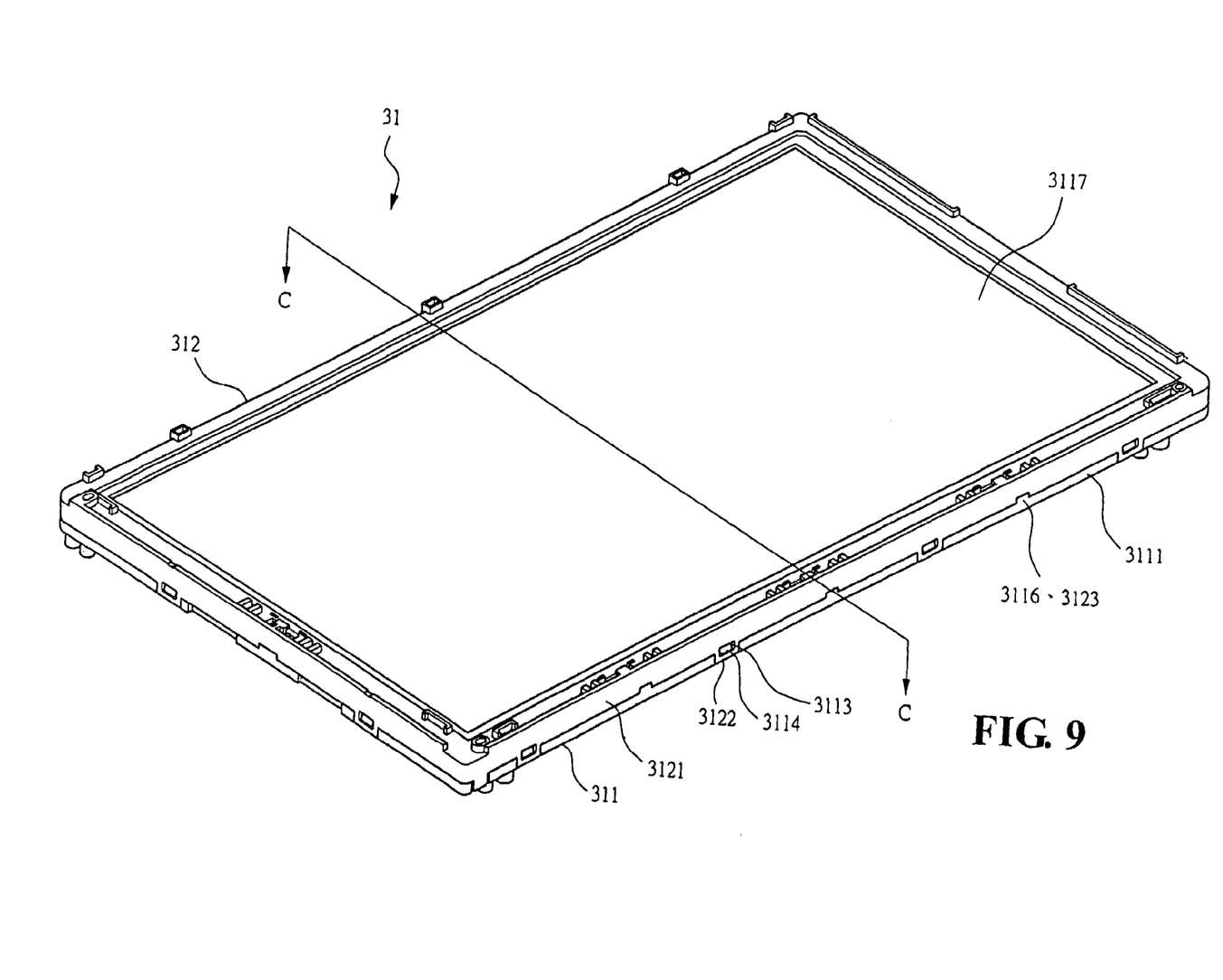
FIG. 9 is a perspective view showing the backlight module of FIG. 7 after its assembly.

To assembly the backlight module 3 illustrated in FIG. 7, at first, the light source unit 35 is placed inside the reflector 36, and the light source unit 35 and the reflector 36 are fixed to a side of the frame structure 31. Then, the reflection plate 32 and the light guide plate 33 are placed in the hollow area 3117 of the plate member 311, with the light incidence side of the light guide plate 33 embedded into the opening of the reflector 36. The optical films 34 are then stacked on the light guide plate 33. At last, the frame member 312 is pressed against the plate member 311 so that their corresponding clasp elements 3122 and hook elements 3114 are locked to each other. In the mean time, the stopping blades 3116 on the edges 3111 of the plate member 311 would be embedded into the corresponding grooves 3123 of the frame member 312. On the other hand, the blades 3124 on the edges 3121 of the frame member 312 would be embedded into the openings 3115 along the surrounding walls 3112 of the plate member 311. As such, the surrounding walls 3112 of the plate member 311 are fitted tightly inside and against the edges 3121 of the frame member 312 and smooth surfaces are formed at where the frame member 312 and the plate member 311 are joined, as shown in FIG. 9.

Figure 10:
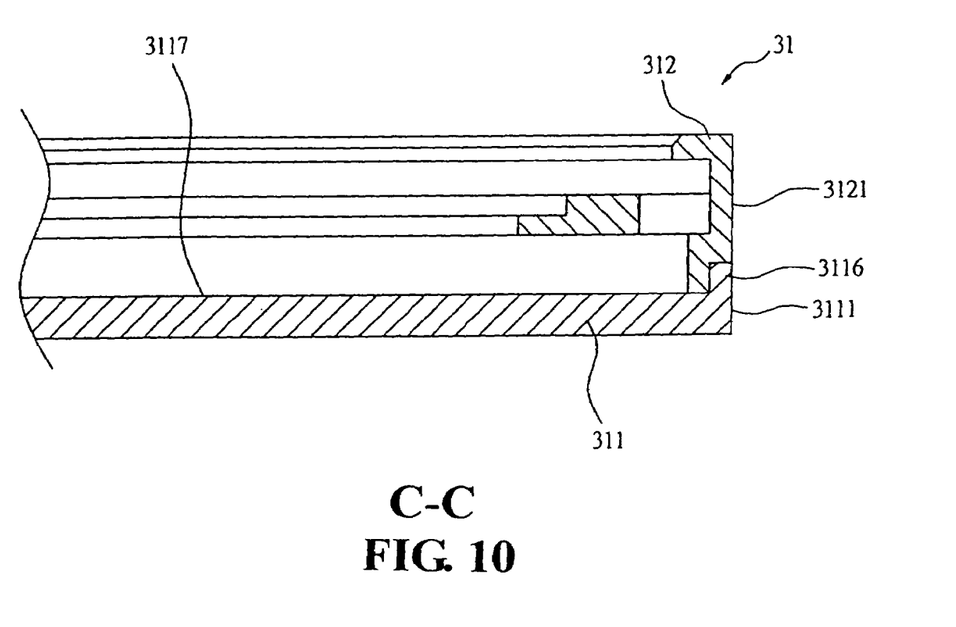
FIG. 10 is schematic sectional view showing the locking mechanism of the backlight module of FIG. 7 along the C-C line.

As shown in FIG. 10, because of the configuration of the stopping blades 3116, when the frame member 312 is under a heavy pressure or impact, the stopping blades 3116 would prevent the frame member 312 from deformation and escape from the plate member 311, as can be seen from FIG. 10. The stopping blades 3116 on the edges 3111 of the plate member 311 are embedded into the corresponding grooves 3123 of the frame member 312 so that the surrounding walls 3112 of the plate member 311 are fitted tightly inside and against the edges 3121 of the frame member 312 without increasing any surface area of the backlight module 3 and causing installation issues. Additionally, such an airtight integration of the frame member 312 and the plate member 311 would prevent any light leakage from the frame structure 31, which would also enhance the lighting efficiency of the backlight module 3.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A frame structure of a backlight module, comprising:

a plate member having a plurality of notches along the edges of said plate member, each of said plurality of notches having a hook element there within, said plate member further having a plurality of stopping blades extending upward from top of the edges of said plate member; and a frame member having a plurality of clasp elements along the edges of said frame member corresponding to said plurality of hook elements, said frame member further having a plurality of grooves along the edges of said frame member corresponding to said plurality of stopping blades;

wherein, when said frame member is joined to said plate member, said corresponding clasp elements and hook elements are fixedly locked to each other; and said stopping blades are embedded into said corresponding grooves to prevent said frame member from deformation and escape under heavy pressure or strong impact.

2. The frame structure according to claim 1, wherein said plate member has a plurality of surrounding walls on top of the edges of said plate member, receding toward the inside of said plate member for an appropriate short distance.

3. The frame structure according to claim 2, wherein said surrounding walls have a plurality of openings configured right across said stopping blades.

4. The frame structure according to claim 1, wherein said frame member further has a plurality of blades along the edges of said frame member receding inward behind said plurality of grooves.

* * * * *